United States Patent Office 3,300,493
Patented Jan. 24, 1967

3,300,493
PRODUCTION OF MELAMINE
Guenther Hamprecht, Limburgerhof, Pfalz, Hermann Dieter Fromm, Ludwigshafen (Rhine), Matthias Schwarzmann, Limburgerhof, Pfalz, and Eberhard Rother, Ludwigshafen (Rhine), Germany, assignors to Badische Anilin- & Soda-Fabrik Aktiengesellschaft, Ludwigshafen (Rhine), Germany
No Drawing. Filed Mar. 23, 1965, Ser. No. 442,177
Claims priority, application Germany, Mar. 28, 1964, B 76,107
11 Claims. (Cl. 260—249.7)

The present invention relates to a process for the production of melamine by heating urea or its thermal decomposition products in the presence of catalysts and ammonia.

It is known that melamine can be prepared by the catalytic conversion of urea at elevated temperatures in the presence of ammonia. The reaction proceeds in two or three stages, namely:

I: The strongly endothermic decomposition of urea to isocyanic acid and ammonia according to the equation:

(I) 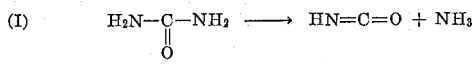

II: The exothermic formation of carbodiimide or cyanamide from isocyanic acid according to the equation:

(II) 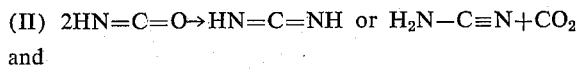

and

III: The exothermic polymerization of cyanamide to melamine according to the equation:

(III) 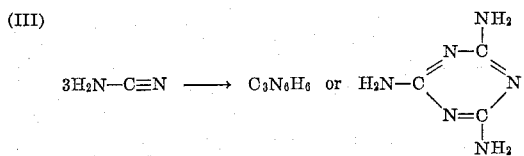

Stages II and III take place practically simultaneously and may be regarded as one stage.

In general, the procedure is that solid or liquid urea is vaporized in a suitable apparatus, for example a fluidized bed reactor, at a temperature of about 350° C. and the gas obtained is supplied to one or more beds (stationary or fluidized) of catalyst kept also at a temperature of about 350° C. The fluidized bed serving for the vaporization may be operated with inert or catalytic material. In the latter case, part of the melamine forms in the vaporizer. This not only takes the load off the later reactors but also decreases the heat requirement in the vaporizer according to the heat of reaction provided by the exothermic stages of the process.

A considerable disadvantage of the prior art methods for the production of melamine from urea has been the fact that a very large amount of ammonia must be passed into the reaction zone to ensure a satisfactory course of the reaction, for example about 3 to 5 cu. m. (S.T.P.) per kg. of urea, i.e. 15 cu. m. of ammonia per kg. of melamine. If the reaction be carried out in the presence of less ammonia, the melamine is partly decomposed by the disengagement of ammonia into melem and other non-volatile products. This leads to coating of the pores and surfaces of the catalyst so that in continuous operation a constant decrease in activity of the catalyst occurs and the gas mixture leaving the reactor has an increasing content of isocyanic acid which, when the reaction gas is cooled, recombines with the ammonia present to reform urea. The same disadvantage arises when the reaction zone is charged with other gases or with dilute ammonia, for example the reaction gas freed from melamine and consisting substantially of 1 part by volume of carbon dioxide and 2 parts by volume of ammonia.

To reactivate a catalyst which has become inactive, it is necessary to purge it for several days with ammonia so that the melem deposited on it may be reconverted into melamine which may then be removed from the catalyst. This again means that economically intolerable amounts of ammonia have to be used.

It is an object of the present invention to provide a process for the production of melamine by converting urea in the presence of catalysts in a two-stage reaction system in which the activity of the catalyst remains constant.

A further object is to provide a process in which the amount of ammonia added to the reaction system is less than in prior processes.

These objects are achieved by vaporizing urea and/or its thermal decomposition products in a first stage at temperatures of from 370° to 450° C., introducing the resultant gas and vapor into a second stage at a temperature of from 330° to 370° C. and continuously or periodically exchanging the catalysts between the first and second stages.

Mixtures of urea and its thermal decomposition products or the decomposition products by themselves may be used instead of urea in known manner. Biuret, ammeline and ammelide are examples of thermal decomposition products.

It has been found that, surprisingly, when the conditions according to this invention are maintained there is no appreciable loss of activity, evidenced by lower yields of melamine, even in continuous operation. The process according to this invention may be carried out batchwise by withdrawing the catalyst from the second stage (which may if desired consist of a plurality of zones, for example two or more fluidized beds in series) when its activity begins to decline and introducing it into the first stage, while the catalyst removed from the first stage is introduced into the second sage. The process may also be carried out continuously for example by withdrawing in known manner from the second stage 5% per hour of the amount of catalyst contained therein and introducing it into the first stage and replacing the withdrawn catalyst by catalyst from the first stage.

The first stage is operated at higher temperature than the second stage in the process according to this invention. The temperatures chosen for the first stage may be 370° to 450° C., preferably 380° to 410° C., and for the second stage may be 330° to 370° C.

By working in accordance with this invention, the amount of ammonia required for the reaction, which in the case of stationary beds of catalyst serves as a sublimation gas to lead the reaction gas away quickly and in the case of a fluidized bed of catalyst also serves as fluidizing gas, can be greatly decreased. Thus for example the reaction may be carried out continuously with 1 kg. of ammonia per kg. of urea without any falling off of the catalyst activity being noticeable. It is particularly advantageous that it is not essential to use pure ammonia as a purge gas or fluidizing gas, but that the reaction may also be carried out with ammonia which is diluted with other gases, for example carbon dioxide or the gas mixture formed and freed from melamine, which consists substantially of carbon dioxide and ammonia. It is true that lower yields are obtained by this method than when using pure ammonia, but this disadvantage is outweighed by the advantage of a considerable simplification of the process.

The invention is further illustrated by the following examples.

Example 1

(a) 2 liters of aluminum oxide having a particle diameter of 0.1 to 0.5 mm. is fluidized in a fluidized bed reactor by passing in 800 liters of ammonia per hour. 600 g. per hour of urea is introduced continuously into the reactor. The temperature of the fluidized bed is kept at 450° C. The vapor formed is supplied together with the ammonia to a second fluidized bed kept at a temperature of 350° C. and containing 5 liters of aluminum oxide having the same particle diameter. The effluent reaction gas is passed through a filter and supplied to a condensation chamber kept at 90° C. in which melamine and unreacted urea are deposited. The apparatus is shut down every twenty-two hours and the amount and purity of the melamine are determined. The following results are obtained:

| Day | Crude material in g. | Content of melamine, percent | Yield of melamine, percent of theory |
|---|---|---|---|
| 1st | 4,520 | 96 | 94 |
| 2nd | 4,580 | 94 | 93.1 |
| 3rd | 4,470 | 88 | 85.4 |
| 4th | 4,800 | 81 | 84.4 |

(b) 600 g. of urea per hour is converted to melamine as described under (a). The apparatus is shut down every seven hours and the catalyst from the first reactor is exchanged for 2 liters of the catalyst from the second reactor. The following results are thus obtained:

| Day | Crude material in g. | Content of melamine, percent | Yield of melamine, percent of theory |
|---|---|---|---|
| 1st | 4,430 | 96 | 92 |
| 2nd | 4,500 | 96 | 93.5 |
| 3rd | 4,600 | 95 | 94.5 |
| 4th | 4,480 | 97 | 94 |
| 8th | 4,510 | 96 | 94 |

Example 2

(a) 600 g. of urea per hour is converted into melamine in an apparatus as described in Example 1 but with the difference that 1200 liters per hour of a gas mixture consisting of two-thirds of ammonia and one-third of carbon dioxide is used as fluidizing gas instead of ammonia. Under otherwise the same conditions, the following yields of crude melamine are obtained:

| Day | Crude material in g. | Content of melamine, percent | Yield of melamine, percent of theory |
|---|---|---|---|
| 1st | 4,520 | 87 | 85 |
| 2nd | 4,900 | 78 | 82.6 |
| 3rd | 5,010 | 76 | 82.5 |
| 4th | 5,500 | 64 | 76.4 |

(b) 600 g. per hour of urea is converted into melamine with 1200 liters per hour of a fluidizing gas as described under (a) but with the difference that the apparatus is shut down every seven hours and the catalyst from the first reactor is exchanged for an equal amount of catalyst from the second reactor. The following results are obtained:

| Day | Crude material in g. | Content of melamine, percent | Yield of melamine, percent of theory |
|---|---|---|---|
| 1st | 4,630 | 86 | 86.4 |
| 2nd | 4,620 | 85 | 85 |
| 3rd | 4,470 | 87 | 84 |
| 4th | 4,430 | 88 | 84.5 |
| 8th | 4,660 | 85 | 86 |

In the method described under (b), a crude product is obtained whose melamine content remains practically constant over eight days. The yield of melamine also does not change appreciably during this period. In contrast, the yield of melamine under the conditions described under (a) falls by about 9% after only four days and the content of melamine in the crude product is much less.

Example 3

(a) 5 liters of aluminum oxide having a particle diameter of 0.1 to 0.5 mm. is kept fluidized by passing 800 liters of ammonia and 400 liters of carbon dioxide per hour into a fluidized bed reactor. The reactor is kept at 370° C. and 500 g. per hour of urea is continuously introduced. The reaction gas formed is supplied together with the fluidizing gas to a second fluidized bed, kept at 330° C., in which 5 liters of aluminum oxide having the same particle size is fluidized. Under the conditions described in Example 1(a) the melamine formed is separated and determined. The following results are obtained:

| Day | Crude material in g. | Content of melamine, percent | Yield of melamine, percent of theory |
|---|---|---|---|
| 1st | 3,998 | 88 | 91 |
| 2nd | 3,800 | 86 | 85 |
| 3rd | 3,576 | 87 | 81 |
| 4th | 3,262 | 87 | 74 |

(b) 500 g. per hour of urea is converted to melamine as described under (a) with the difference that 10% of the catalyst from the first reacaor is exchanged per hour for the same amount of the catalyst from the second reactor through two air lock gates connecting the two reactors. The following results are obtained:

| Day | Crude material in g. | Content of melamine, percent | Yield of melamine, percent of theory |
|---|---|---|---|
| 1st | 3,980 | 89 | 92 |
| 2nd | 3,950 | 87 | 89 |
| 3rd | 4,090 | 85 | 90 |
| 4th | 3,858 | 88 | 88 |
| 8th | 3,850 | 89 | 89 |

We claim:

1. A process for the production of melamine by heating urea at temperatures above 280° C. in two stages in the presence of catalysts and ammonia wherein the urea is vaporized at a temperature of from 370° to 450° C. in a first stage and the gas and vapor is then introduced into a second stage at a temperature of from 330° to 370° C., the catalysts in the first and second stages being at least partly exchanged during the reaction.

2. A process as claimed in claim 1 wherein the catalysts are exchanged continuously.

3. A process as claimed in claim 1 wherein the catalysts are exchanged periodically.

4. A process as claimed in claim 1 wherein the urea is mixed with its thermal composition products.

5. A process as claimed in claim 1 wherein the ammonia is added in the form of the gases formed by the reaction and freed from melamine.

6. A process as claimed in claim 1 wherein the temperature in the first stage is kept at 380° to 410° C.

7. A process for the production of melamine by heating thermal decomposition products of urea at temperatures above 280° C. in two stages in the presence of catalysts and ammonia wherein the decomposition products of urea are vaporized at a temperature of from 370° to 450° C. in a first stage and the gas and vapor is then introduced into a second stage at a temperature of from 330° to 370° C., the catalysts in the first and second stages being at least partly exchanged.

8. A process as claimed in claim 7 wherein the catalysts are exchanged continuously.

9. A process as claimed in claim 7 wherein the catalysts are exchanged periodically.

10. A process as claimed in claim 7 wherein the ammonia is added in the form of the gases formed by the reaction and freed from melamine.

11. A process as claimed in claim 7 wherein the decomposition products are selected from the group consisting of biuret, ammeline and immelide or mixtures thereof.

References Cited by the Examiner

UNITED STATES PATENTS 3,152,128  10/1964  Steggerda ‒‒‒‒‒‒‒‒‒ 260—249.7
3,158,611  11/1964  Crowley ‒‒‒‒‒‒‒‒‒‒ 260—249.7

WALTER A. MODANCE, *Primary Examiner.*

JOHN M. FORD, *Assistant Examiner.*